United States Patent [19]

McKown et al.

[11] Patent Number: 5,181,568

[45] Date of Patent: Jan. 26, 1993

[54] METHODS OF SELECTIVELY REDUCING THE WATER PERMEABILITIES OF SUBTERRANEAN FORMATIONS

[75] Inventors: Kenneth W. McKown; Danny Rothenberger, both of Hays, Kans.

[73] Assignee: Halliburton Company, Duncan, Okla.

[21] Appl. No.: 766,604

[22] Filed: Sep. 26, 1991

[51] Int. Cl.⁵ .............................................. E21B 33/138
[52] U.S. Cl. .................................. 166/293; 166/294; 166/295; 166/300
[58] Field of Search ............... 166/285, 293, 294, 295, 166/300

[56] References Cited

U.S. PATENT DOCUMENTS

| | | | |
|---|---|---|---|
| 2,800,963 | 7/1957 | Roberts et al. | 166/293 |
| 2,878,875 | 3/1959 | Dunlap et al. | 166/293 |
| 2,887,159 | 5/1959 | Harley et al. | 166/293 |
| 3,016,092 | 1/1962 | Harvey et al. | 166/293 |
| 3,762,476 | 10/1973 | Gall | 166/294 |
| 3,830,302 | 8/1974 | Dreher et al. | 166/294 |
| 3,833,061 | 9/1974 | Gall | 166/294 |
| 3,967,681 | 7/1976 | Curzon | 166/294 X |
| 3,981,363 | 9/1976 | Gall | 166/270 |
| 4,009,755 | 3/1977 | Sandiford | 166/295 X |
| 4,039,029 | 8/1977 | Gall | 166/294 |
| 4,160,674 | 7/1979 | Sawyer . | |
| 4,524,829 | 6/1985 | Hanlon et al. | 166/294 |
| 4,532,052 | 7/1985 | Weaver et al. | 166/294 X |
| 4,600,057 | 7/1986 | Borchardt | 166/295 |
| 4,617,132 | 10/1986 | Dalrymple et al. | 166/294 X |
| 4,664,713 | 5/1987 | Almond et al. | 166/294 X |
| 4,761,183 | 8/1988 | Clarke . | |
| 4,817,719 | 4/1989 | Jennings, Jr. | 166/295 X |
| 5,071,484 | 12/1991 | Bonifay et al. | 106/692 X |
| 5,076,362 | 12/1991 | Beardmore | 166/295 X |

*Primary Examiner*—George A. Suchfield
*Attorney, Agent, or Firm*—Thomas R. Weaver; C. Clark Dougherty, Jr.

[57] ABSTRACT

The water permeability and the production of salt water from a subterranean oil bearing formation is reduced by introducing a viscous aqueous polymer composition into the formation which will subsequently form a crosslinked gel therein, and thereafter introducing a hydrocarbon cement slurry into the formation.

16 Claims, No Drawings

METHODS OF SELECTIVELY REDUCING THE WATER PERMEABILITIES OF SUBTERRANEAN FORMATIONS

BACKGROUND OF THE INVENTION

1. Field of the Invention

The present invention relates generally to methods of selectively reducing the water permeabilities of subterranean formations, and more particularly, to improved methods of reducing the production of salt water from wells which produce both oil and salt water.

2. Description of the Prior Art

A problem often encountered in the production of oil from oil-bearing formations or zones is the simultaneous production of salt water. While the oil well is usually completed in an oil-bearing zone, when there is a salt water bearing zone adjacent the oil zone, the higher mobility of the salt water often allows it to flow into the oil zone by way of natural fractures and high permeability streaks. In the production of such wells, the ratio of salt water to oil recovered often becomes so high that the cost of producing the salt water, separating the salt water from the produced oil and disposing of the salt water represents a significant economic loss.

In order to reduce the production of salt water from such wells, viscous aqueous polymer solutions have been utilized heretofore. That is, an aqueous polymer solution is pumped into the oil zone so that it enters the salt water zone communicated therewith. The polymer solution is then crosslinked whereby a stiff gel is formed which plugs the natural fractures and high permeability streaks through which salt water flows from the water zone to the oil zone.

While the use of aqueous polymer solutions for reducing the production of salt water has achieved varying degrees of success, the lack of strength of a cross-linked polymer will cause it to deteriorate over time and to be produced back out of the well with salt water produced therefrom. The presence of the polymer in the salt water results in the water becoming contaminated with bacteria which in turn causes corrosion of tubular goods and other problems in salt water disposal wells.

Because a salt water reduction treatment using an aqueous polymer solution requires that a relatively large volume of the aqueous polymer solution be pumped into the producing formation, the permeability of the oil zone is often reduced. If an oil production stimulation treatment is subsequently carried out in the oil zone, the production of polymer with the oil and water produced is increased. Additionally, the oil produced from an aqueous polymer solution treated well usually can not be pumped in that the increased pressure drop at the well bore causes the deterioration of the crosslinked polymer and its production with the produced oil and salt water.

The relatively large volume of aqueous polymer solution required for performing the heretofore used polymer water reduction treatments cause the treatments to be very expensive.

Thus, there is a need for an improved method of selectively reducing the water permeability of a subterranean oil-bearing formation without incurring the above mentioned problems and high cost.

SUMMARY OF THE INVENTION

By the present invention, improved methods of selectively reducing the water permeabilities of subterranean formations containing oil and water zones are provided which overcome the shortcomings of the prior art and meet the need recited above. In accordance with the invention, a relatively small quantity of a viscous aqueous polymer composition which will subsequently form a crosslinked gel is introduced into the oil containing zone. Thereafter, a hydrocarbon liquid slurry of particulate cement is introduced into the zone which when in contact with water hydrates and sets into a substantially impermeable mass. The cement in the hydrocarbon slurry will not hydrate and set in the oil zone because of the absence of water therein, and the introduction of the hydrocarbon cement slurry into the oil zone displaces portions of it and the aqueous polymer composition into the fractures and high permeability streaks communicating the oil zone with the water zone. The presence of the water in the fractures and high permeability streaks causes the cement to hydrate and set into a substantially impermeable mass. The aqueous polymer solution which subsequently crosslinks into a stiff gel is prevented from deteriorating and being produced back by the set cement.

In a preferred technique, after the hydrocarbon cement slurry is introduced into the oil and water producing zones and before allowing the aqueous polymer composition to crosslink and the cement to set, a quantity of liquid hydrocarbon is introduced into the oil zone to displace aqueous polymer composition remaining in the oil zone therefrom and to thereby insure oil communication between the oil-bearing zone and the well bore.

It is, therefore, a general object of the present invention to provide improved methods of selectively reducing the water permeabilities of oil-bearing subterranean formations.

Other and further objects and advantages of the present invention will be readily apparent to those skilled in the art upon a reading of the description of preferred embodiments which follows.

DESCRIPTION OF PREFERRED EMBODIMENTS

The improved methods of the present invention utilize the combination of a viscous aqueous polymer composition which will subsequently crosslink followed by a hydrocarbon cement slurry to reduce the production of salt water from a subterranean oil producing zone without subsequently producing back the polymer. The viscous aqueous polymer composition is first introduced into the oil zone. The aqueous polymer composition includes a delayed crosslinking agent whereby the composition will subsequently form a stiff crosslinked gel. After the introduction of the aqueous polymer composition, a hydrocarbon cement slurry containing cement particles of a sufficiently small size to enter fractures and high permeability streaks in the formation is introduced into the oil zone. Because the hydrocarbon cement slurry displaces most of the aqueous polymer composition ahead of it and because of the absence of water in the oil zone, the cement does not hydrate and set in the oil zone and that which remains in the oil zone is produced back therefrom. However, the hydrocarbon cement slurry which enters fractures and high permeability streaks communicating the oil zone with the water zone absorbs water and the cement hydrates and sets into a substantially impermeable mass. After placement of the viscous aqueous polymer composition and hydrocarbon cement slurry in the formation, the aqueous polymer composition is allowed to crosslink and the cement to set prior to placing the well back on production.

The viscous aqueous polymer composition functions to provide resistance and fluid loss reduction in the water communicating fractures and high permeability streaks whereby when the hydrocarbon cement slurry is introduced into the fractures and streaks, it is not prevented from properly setting and plugging the fractures and streaks as a result of excessive fluid loss or simply pumped through the fractures and streaks deep into the water zone. In addition, upon being crosslinked into a stiff gel, the aqueous polymer composition functions to help plug the permeability of the formation between the oil and water containing zones. The hydrocarbon cement slurry which is largely confined to the oil and water zone communicating fractures and high permeability streaks hydrates and sets therein to provide substantially impermeable masses in the fractures and streaks which substantially prevent the crosslinked polymer from deteriorating and being produced back.

Aqueous polymer compositions which will subsequently form crosslinked gels and which are useful in accordance with the present invention are comprised of water, one or more hydrophillic organic polymers having a molecular weight greater than about 100,000 and containing carboxyl functionality, and a delayed crosslinking agent. Examples of polymers which can be used include carboxyalkyl and carboxylalkylhydroxyalkyl guar wherein the alkyl groups have in the range of from 1 to about 3 carbon atoms, xanthan gum, polyacrylamide and polymethacrylamide wherein in the range of from about 5% to about 75% of the carboxamide groups are hydrolyzed to carboxyl groups, cellulose ether polymers containing carboxyl functionality and copolymers of acrylamide or methacrylamide with acrylic acid or methacrylic acid or both.

The polymers are preferably substantially free of crosslinking between chains. As used herein, the term "hydrolyzed" includes modified polymers wherein the carboxyl groups are in the acid form or the salt form, provided the salts are water soluble. Such salts include ammonium salts, alkali metal salts and others. Hydrolysis of the polymers can be carried out in any suitable fashion; for example, by heating an aqueous solution of the polymer with a suitable amount of sodium hydroxide. Examples of cellulose ethers which can be used include carboxyalkyl cellulose ethers and carboxyalkylhydroxyalkyl cellulose ethers, e.g., carboxymethyl cellulose and carboxymethylhydroxyethyl cellulose. Cellulose ethers that contain carboxyl functionality are commercially available as alkali metal salts, usually sodium salts.

The copolymers of acrylamide and methacrylamide with acrylic acid or methacrylic acid or both are preferably comprised of from about 5% to about 70% by weight of acrylic acid or methacrylic acid or both, and most preferably from about 10% to about 40% by weight of acrylic acid or methacrylic acid or both.

Of the water soluble polyacrylamides that can be used, homopolymers and copolymers of acrylamide and methacrylamide are preferred. These polymers can contain from about 5% to about 75% and preferably about 40% of the carboxamide groups hydrolyzed to carboxyl groups. The most preferred such polymer is polyacrylamide wherein in the range of from about 7% to about 30% of the carboxamide groups are hydrolyzed to carboxyl groups.

As indicated above, the polymers should have a molecular weight of at least about 100,000, but the upper limit of the molecular weight is not critical so long as the polymer is water disperable and the aqueous gel prepared therefrom can be pumped. The amount of the polymers used in the practice of this invention can vary widely depending upon the particular polymer used and the desired properties of the gel formed therewith. Generally, polymer amounts in the range of from about 0.0025% to about 5% by weight of water can be used. Preferably the amount of polymer combined with the water used is such that the resulting gelled water has a viscosity in the range of from about 1.2 cp to about 1000 cp measured on a Fann Model 35 Viscometer with a No. 1 bob and spindle.

The water to which the polymer is added can be fresh water, salt water, seawater or brine, and the polymer or polymers used can be dispersed and dissolved in the water by stirring, pumping or by means of a suitable turbulence inducing device to cause shearing such as a jet nozzle.

A variety of delayed crosslinking agents can be utilized for causing the aqueous polymer solution to crosslink into a rigid gel after placement in the subterranean formation. Generally, the delayed crosslinking agent can be comprised of any multivalent cation selected from the group consisting of $Fe^{2+}$, $Fe^{3+}$, $Al^{3+}$, $Ti^{4+}$, $Zn^{2+}$, $Sn^{4+}$, $Ca^{2+}$, $Mg^{2+}$ and $Cr^{3+}$ complexed with a retarding anion. While various retarding anions, i.e., anions which require time in water to disassociate from the multivalent cation before the cation can crosslink the polymer can be used. Examples of such retarding anions are acetate, nitrilotriacetate, tartrate, citrate, tripolyphosphate, metaphosphate, gluconate and orthophosphate. When such a delayed crosslinking agent is utilized, e.g., aluminum citrate, it is combined with the aqueous polymer solution just prior to when the aqueous polymer solution is pumped into a subterranean formation to be treated therewith.

An alternate form of delayed crosslinking agent is a water soluble polyvalent metal compound wherein the polyvalent metal is capable of being reduced to a lower valence state. At the higher valence state, the polyvalent metal is slow to crosslink an aqueous polymer gel, but at the lower valence state crosslinking takes place rapidly. The water soluble polyvalent metal compound is combined with the aqueous polymer solution to be crosslinked along with a reducing agent for reducing the polyvalent metal to the lower valence state. The reaction between the reducing agent and the polyvalent metal to lower the valence state of the polyvalent metal and commence crosslinking takes time, and thus, the crosslinking of the polymer solution is delayed. Examples of polyvalent metal compounds which are water soluble and the polyvalent metal of which can be reduced to a lower valence state are ammonium chromate, ammonium dichromate, the alkali metal chromates and dichromates and chromium trioxide. Examples of water soluble reducing agents which can be utilized with the aforesaid polyvalent metal compounds are hydroquinone, sodium sulfide, sodium hydrosulfite, sodium and potassium metabisulfite, sodium bisulfite, sodium and potassium sulfite, sodium thiosulfate, ferrous sulfate, ferrous chloride, thiourea, hydrazine phosphite, hydrazine dihydrochloride, and hydrazinobenzoic acid. A preferred crosslinking agent of this type is comprised of sodium dichromate and thiourea.

The hydrocarbon cement slurry utilized in accordance with this invention is comprised of a low viscosity, non-volatile hydrocarbon liquid having particulate hydraulic cement dispersed therein.

Examples of suitable hydrocarbon liquids are aliphatic liquids such as hexane, heptane or octane; aromatic liquids such as benzene, toluene or xylene and distillates such as kerosene, diesel oil, mineral oil and lubricating oil.

In order for the particulate hydraulic cement to be capable of entering water conductive fractures and high permeability streaks, a cement of fine particle size must be utilized. A preferred such fine particle size cement is one consisting of discrete particles of cementitious material having diameters no larger than about 30 microns, preferably no larger than about 17 microns, and still more preferably no larger than about 11 microns. The distribution of the various sized particles within the cementitious material should be such that 90% of the particles have a diameter not greater than about 25 microns, preferably about 10 microns, and still more preferably about 7 microns; 50% have a diameter not greater than about 10 microns, preferably about 6 microns, and still more preferably about 4 microns; and 20% of the particles have a diameter not greater than about 5 microns, preferably about 3 microns and still more preferably about 2 microns.

The particle size of the hydraulic cement can be indirectly expressed in terms of the surface area per unit weight of a given sample of the cement. This value, sometimes referred to as Blaine Fineness, can be expressed in units of square centimeters per gram ($cm^2$/gram) and is an indication of the ability of a cement to chemically interact with water and other materials. The activity is believed to increase with increased Blaine Fineness. The Blaine Fineness of the hydraulic cement used in accordance with this invention should be no less than about 6000 $cm^2$/gram, preferably greater than about 7000 $cm^2$/gram, more preferably greater than about 10,000 $cm^2$/gram and most preferably greater than about 13,000 $cm^2$/gram.

Hydraulic cements having the fineness and particle size distribution described above are disclosed in various prior United States patents including U.S. Pat. No. 4,761,183 to Clark which discloses slag and mixtures of slag with Portland cement, and U.S. Pat. No. 4,160,674 to Sawyer which discloses Portland cement. The hydraulic cements can also include fine pozzolan cement and/or fine silica in addition to the slag and/or Portland cement. The cements which are preferred for use in accordance with this invention are Portland cement and combinations thereof with slag wherein the quantity of Portland cement included in a mixture of Portland cement and slag can be as low as 10%, but is preferably no less than about 40%, more preferably about 60% and still more preferably about 80%. The most preferred cement of the fineness and particle size distribution described above is Portland cement.

In order to facilitate the dispersal of the fine particle cement in the hydrocarbon liquid used, a liquid surface active agent (surfactant) which is soluble in the hydrocarbon liquid is preferably utilized. The surfactant is preferably combined with the hydrocarbon liquid used first followed by slowly adding the cement to the hydrocarbon liquid-surfactant blend with continued mixing to obtain a slurry of uniform consistency.

Of the various surfactants which can be used, an organic sulfonic acid or salt thereof dissolved in a low molecular weight alcohol is preferred. The organic sulfonic acid component of the surfactant is preferably selected from dodecylbenzenesulfonic acid, the alkali and alkaline earth metal salts thereof and mixtures of the acid and salts. The low molecular weight alcohol solvent for the organic sulfonic acid component is selected from aliphatic alcohols having in the range of from 1 to 5 carbon atoms. Of these, isopropanol is preferred. The organic sulfonic acid component is preferably present in the surfactant solution in the range of from about 60 parts to about 80 parts, and preferably about 75 parts by volume organic sulfonic acid per 100 parts by volume surfactant solution. The alcohol is preferably present in the surfactant solution in the range of from about 20 parts to about 40 parts, and most preferably about 25 parts by volume alcohol per 100 parts by volume surfactant solution.

The surfactant is mixed with the hydrocarbon liquid used in an amount in the range of from about 10 gallons to about 25 gallons, and preferably about 20 gallons of surfactant per 1000 gallons of hydrocarbon liquid. The quantity of hydrocarbon liquid to be utilized is dependent upon the quantity of the fine particle size cement employed, and is generally in the range of from about 6 gallons to about 10 gallons of hydrocarbon liquid per 100 pounds of cement. The amount of hydrocarbon liquid and surfactant utilized determines the density of the resulting slurry wherein the slurry density is inversely proportional to the quantity of liquid. Accordingly, 4,400 pounds of fine cement, 5.5 gallons of surfactant and 275 gallons of hydrocarbon liquid produce a slurry having a density of about 14.1 lbs. per gallon while 4,400 pounds of fine cement, 8 gallons of surfactant and 400 gallons of hydrocarbon liquid produce a slurry having a density of about 12.5 lbs. per gallon.

As indicated above, the methods of the present invention for selectively reducing the salt water permeability of a subterranean formation containing oil and salt water zones are basically comprised of the steps of first introducing into the oil zone a viscous aqueous polymer composition, i.e., a composition having a viscosity in the range of from about 1.2 cp to about 1000 cp measured on a Fann Model 35 Viscometer with a No. 1 bob and spindle, and which will subsequently form a crosslinked gel, and thereafter introducing a hydrocarbon cement slurry into the zone which when in contact with water hydrates and set into a substantially impermeable mass. The aqueous polymer composition initially enters the oil zone and is substantially displaced by the hydrocarbon cement slurry into the fractures and high permeability streaks communicating the oil zone with the salt water zone. At least a portion of the hydrocarbon cement slurry also enters the fractures and high permeability streaks. The cement in the slurry does not hydrate and set in the oil zone due to the absence of water therein, but it is contacted with water contained in the fractures and high permeability streaks whereby it hydrates and sets therein. After placement, the aqueous polymer composition is allowed to crosslink and the cement is allowed to set prior to returning the well to production. The set cement plugs the fractures and high permeability streaks and prevents the crosslinked polymer therein and in the salt water zone from being produced back.

In a more preferred method of the present invention, a viscous aqueous polymer composition is introduced into the oil zone which will subsequently form a crosslinked gel. Thereafter, a hydrocarbon cement slurry is introduced into the zone which when in contact with water hydrates and sets into a substantially impermeable mass, the cement in the slurry being Portland cement or slag or mixtures thereof having a particle size not greater than about 30 microns and a Blaine Fineness of no less than about 6000 cm$^2$/gram. A quantity of liquid hydrocarbon is next introduced into the oil zone to displace at least a portion of aqueous polymer composition remaining in the oil zone therefrom whereby communication between the oil zone and the well bore is insured. Finally, the aqueous polymer composition is allowed to crosslink and the cement is allowed to set prior to returning the well to production.

In order to further illustrate the methods of the present invention, the following example is given.

EXAMPLE

Seventeen different wells in Kansas were treated utilizing the methods of the present invention. The polymer composition used was comprised of fresh water, 15 gallons of polyacrylamide polymer wherein in the range of from about 7% to about 30% of the carboxamide groups were hydrolyzed to carboxyl groups per 1000 gallons of water, 4 pounds of sodium dichromate crosslinking agent per 1000 gallons of water, 15 pounds of thiourea reducing agent per 1000 gallons of water and other additives comprising 150 pounds of sodium chloride per 1000 gallons of water, 50 pounds of a buffer per 1000 gallons of water, 1 gallon of a surfactant per 1000 gallons of water and 1 pound of a biocide per 1000 gallons of water. The hydrocarbon cement slurry used was comprised of diesel oil and Portland cement of fine particle size, i.e., Portland cement having a particle size not greater than about 30 microns and a Blaine Fineness of no less than about 6000 cm$^2$/gram. The distribution of the cement particles was 90% having a diameter not greater than about 25 microns, 50% having a diameter not greater than 10 microns and 20% of the particles having a diameter not greater than about 5 microns.

The treatment of each of the wells consisted of loading the well annulus with crude oil and setting an isolation packer, if used. The above described aqueous polymer composition having a viscosity in the range of from about 1.2 cp to about 1000 cp measured on a Fann Model 35 Viscometer with a No. 1 bob and spindle was then pumped into the oil zone. A 5 barrel spacer of diesel oil was then pumped followed by the hydrocarbon cement slurry described above. An additional 5 barrel spacer of diesel oil was then pumped followed by up to 20 barrels of lease crude oil overflush. The well was shut in for 72 hours and then returned to production.

The location of each of the treated wells, the formation in which the treatment was carried out, the oil production in barrels of oil per day (BOPD) and the salt water production in barrels of water per day (BWPD) before and after the treatment, the elapsed time between the performance of the treatment and when the after treatment production data given in the Table was ascertained and the amounts of aqueous polymer composition and cement pumped are given in the following Table.

TABLE

| | | Case Histories of Treated Wells | | | | | | |
|---|---|---|---|---|---|---|---|---|
| Location | Subterranean Formation in Which Treatment Was Performed | Production Before Treatment | | Production After Treatment | | Elapsed Time Since Treatment, months | Amount of Aqueous Polymer Composition Pumped, gallons | Amount of Fine Cement Pumped, pounds |
| | | BOPD | BWPD | BOPD | BWBD | | | |
| Butler County, Kansas | Viola | 7 | 895 | 10 | 35 | 0.75 | 2000 | 315 |
| Ellis County, Kansas | Conglomerate | 4 | 600 | 4 | 16 | 1.25 | 1500 | 315 |
| Ellis County, Kansas | Arbuckle | 30 | 3000 | 50 | 150 | — | 4000 | 630 |
| Graham County, Kansas | Arbuckle | 3 | 303 | 4 | 146 | 1.0 | 1500 | 189 |
| Graham County, Kansas | Arbuckle | 3 | 300 | 8 | 72 | 0.5 | 2000 | 315 |
| Logan County, Kansas | Johnson Lime | 39 | 139 | 35 | 80 | — | 2000 | 315 |
| Ness County, Kansas | Cherokee | 3 | 1000 | 5 | 320 | 1.5 | 4750 | 315 |
| Ness County, Kansas | Mississippi | 1 | 700 | 6 | 295 | — | 2500 | 315 |
| Ness County, Kansas | Miss. Chert. | 7 | 339 | 7 | 264 | 1.0 | 2000 | 315 |
| Ness County, Kansas | Miss. Dol. | 3.5 | 1200 | 33 | 200 | 0.25 | 1500 | 315 |
| Phillips County, Kansas | Regan Sand | 7 | 396 | 8 | 225 | 1.5 | 500 | 315 |
| Rice County, Kansas | Dolomite | 6 | 1400 | 72 | 648 | — | 1500 | 315 |

TABLE-continued

| | | Case Histories of Treated Wells | | | | | |
|---|---|---|---|---|---|---|---|
| Location | Subterranean Formation in Which Treatment Was Performed | Production Before Treatment BOPD | BWPD | Production After Treatment BOPD | BWBD | Elapsed Time Since Treatment, months | Amount of Aqueous Polymer Composition Pumped, gallons | Amount of Fine Cement Pumped, pounds |
| Rooks County, Kansas | Arbuckle | 10 | 374 | 30 | 300 | 1.0 | 3000 | 315 |
| Rooks County, Kansas | Arbuckle | 3 | 900 | 7 | 68 | 0.75 | 3000 | 273 |
| Russell County, Kansas | Arbuckle | 6 | 480 | 7 | 250 | 1.5 | 1500 | 150 |
| Staford County, Kansas | Arbuckle | 5 | 800 | 7 | 380 | 0.75 | 2000 | 315 |

From the Table it can be seen that the methods of the present invention are effective in selectively reducing the water permeabilities of salt water production from oil producing formations.

Thus, the present invention is well adapted to carry out the objects and attain the ends and advantages mentioned as well as those which are inherent therein. While numerous changes may be made by those skilled in the art, such changes are encompassed within the spirit of the present invention as defined by the appended claims.

What is claimed is:

1. A method of selectively reducing the water permeability of a subterranean formation containing oil and salt water zones said method comprising the steps of:
    introducing into said oil zone a viscous aqueous polymer composition which will subsequently form a crosslinked gel;
    thereafter introducing into said oil zone a hydrocarbon cement slurry to displace at least a portion of said polymer composition from said oil zone to said salt water zone, said hydrocarbon cement slurry, when in contact with water in said salt water zone, hydrates and sets into a substantially impermeable mass; and
    allowing said aqueous polymer composition to crosslink and said cement to set;
    wherein said aqueous polymer composition comprises water, at least one crosslinkable polymer and a delayed crosslinking agent and
    wherein said hydrocarbon cement slurry is comprised of a hydrocarbon liquid, a particulate hydraulic cement having a particle size not greater than about 30 microns and a surfactant for facilitating the dispersal of said cement in said hydrocarbon liquid.

2. The method of claim 1 which is further characterized to include the step of introducing a quantity of liquid hydrocarbon into said formation after said hydrocarbon cement slurry is introduced therein and before allowing said aqueous polymer composition to crosslink and said cement to set to thereby displace at least a portion of the aqueous polymer composition remaining in said oil zone therefrom.

3. The method of claim 1 wherein said polymer is a hydrophillic organic polymer having a molecular weight greater than 100,000 and containing carboxyl functionality.

4. The method of claim 3 wherein said polymer is selected from the group consisting of carboxyalkyl and carboxyalkylhydroxyalkyl guar wherein the alkyl groups have from 1 to 3 carbon atoms, xanthan gum, polyacrylamide and polymethacrylamide wherein in the range of from about 5% to about 75% of the carboxamide groups are hydrolyzed to carboxyl groups, cellulose ether polymers containing carboxyl functionality and copolymers of acrylamide or methacrylamide with acrylic acid or methacrylic acid or both.

5. The method of claim 3 wherein said polymer is polyacrylamide wherein in the range of from about 7% to about 30% of the carboxamide groups are hydrolyzed to carboxyl groups.

6. The method of claim 1 wherein said delayed crosslinking agent is a multivalent cation selected from the group consisting of $Fe^{2+}$, $Fe^{3+}$, $Al^{3+}$, $Ti^{4+}$, $Zn^{2+}$, $Sn^{4+}$, $Ca^{2+}$, $Mg^{2+}$ and $Cr^{3+}$ complexed with a retarding anion selected from the group consisting of acetate, nitrilotriacetate, tartrate, citrate, tripolyphosphate, metaphosphate, gluconate and orthophosphate.

7. The method of claim 1 wherein said crosslinking agent is a water soluble polyvalent metal compound wherein said polyvalent metal is capable of being reduced to a lower valence state and a water soluble reducing agent for reducing said metal to said lower valence state.

8. The method of claim 7 wherein said polyvalent metal compound is selected from the group consisting of ammonium chromate, ammonium dichromate, the alkali metal chromates and dichromates and chromium trioxide, and said reducing agent is selected from the group consisting of hydroquinone, sodium sulfide, sodium hydrosulfite, sodium and potassium metabisulfite, sodium bisulfite, sodium and potassium sulfite, sodium thiosulfate, ferrous sulfate, ferrous chloride, thiourea, hydrazine phosphite, hydrazine dihydrochloride, and hydrazinobenzoic acid.

9. The method of claim 1 wherein said hydrocarbon liquid is selected from the group consisting of hexane, heptane, octane, benzene, toluene, xylene, kerosene, diesel oil and lubricating oil.

10. The method of claim 1 wherein said hydraulic cement has a Blaine Fineness of no less than about 6000 $cm^2/gram$.

11. The method of claim 10 wherein said hydraulic cement is selected from the group consisting of Portland cement, pozzolan cement, silica, slag or mixtures thereof.

12. The method of claim 1 wherein said surfactant is comprised of dodecylbenzenesulfonic acid or one or more of the alkali and alkaline earth metal salts thereof or mixtures of said acid and salts dissolved in a low molecular weight alcohol wherein said dodecylbenzenesulfonic acid or the alkali and alkaline earth metal salts thereof or mixtures thereof are present in said solution in an amount in the range of from about 60 to about 80 parts by volume per 100 parts by volume of said solution.

13. A method of selectively reducing the salt water production from a subterranean formation containing oil and salt water zones said method comprising the steps of:
   (a) introducing into said oil zone a viscous aqueous polymer composition which will subsequently form a crosslinked gel wherein said aqueous polymer composition is comprised of water, a hydrophilic organic polymer having a molecular weight greater than 100,000 and containing carboxyl functionality, and a delayed crosslinking agent;
   (b) thereafter introducing into said oil zone a hydrocarbon cement slurry to displace at least a portion of said polymer composition from said oil zone to said salt after zone, said hydrocarbon cement slurry, when in contact with water in said salt water zone, hydrates and sets into a substantially impermeable mass, said hydrocarbon cement slurry being comprised of a hydrocarbon liquid, a particulate hydraulic cement having a particle size no greater than about 30 microns, having a Blaine Fineness of no less than about 6000 $cm^2$/gram, and being Portland cement or slag or a mixture thereof and a surfactant for facilitating the dispersal of said cement in said hydrocarbon liquid;
   (c) introducing a quantity of liquid hydrocarbon into said formation to displace at least a portion of said aqueous polymer composition remaining in said oil zone therefrom; and
   (d) allowing said aqueous polymer composition to crosslink and said cement to set.

14. The method of claim 13 wherein said polymer is polyacrylamide wherein in the range of from about 7% to about 30% of the carboxamide groups are hydrolyzed to carboxyl groups and said crosslinking agent is comprised of sodium dichromate and thiourea.

15. The method of claim 14 wherein said hydrocarbon cement slurry introduced in accordance with step (b) is comprised of diesel oil and particulate Portland cement wherein 90 percent of the cement particles have a diameter not greater than about 25 microns, 50 percent of the particles have a diameter not greater than about 10 microns and 20 percent of the particles have a diameter not greater than about 5 microns.

16. The method of claim 15 wherein said hydrocarbon liquid introduced in accordance with step (c) is crude oil.

* * * * *